United States Patent
Zhang et al.

(10) Patent No.: US 6,941,639 B2
(45) Date of Patent: Sep. 13, 2005

(54) METHOD FOR REPAIRING GENERATOR ROTOR

(75) Inventors: Jiping Zhang, Winter Springs, FL (US); Kevin Light, Maitland, FL (US); William Cannon Gardner, Rock Hill, SC (US); Randy Edward Whitener, Düsseldorf (DE)

(73) Assignee: Siemens Westinghouse Power Corporation, Orlando, FL (US)

( * ) Notice: Subject to any disclaimer, the term of this patent is extended or adjusted under 35 U.S.C. 154(b) by 169 days.

(21) Appl. No.: 10/259,132

(22) Filed: Sep. 27, 2002

(65) Prior Publication Data

US 2004/0061403 A1 Apr. 1, 2004

(51) Int. Cl.$^7$ .......................... H02K 15/02; H02K 15/10
(52) U.S. Cl. ........................... 29/598; 29/596; 29/597; 29/402.05; 29/402.06; 29/402.07; 29/402.08; 310/215; 310/261; 310/270; 310/271
(58) Field of Search .......................... 29/598, 596, 597, 29/402.05, 402.06, 402.07, 402.08; 310/215, 261, 270, 271

(56) References Cited

U.S. PATENT DOCUMENTS

| | | | |
|---|---|---|---|
| 5,172,475 A | * | 12/1992 | Amos et al. ............... 29/889.1 |
| 5,174,011 A | | 12/1992 | Weigelt |
| 5,528,097 A | | 6/1996 | Gardner et al. |
| 5,861,698 A | | 1/1999 | Murphy |
| 5,883,456 A | | 3/1999 | Gardner et al. |
| 6,115,917 A | * | 9/2000 | Nolan et al. ............... 29/889.1 |
| 6,124,661 A | | 9/2000 | Gardner |
| 6,218,756 B1 | * | 4/2001 | Gardner et al. ............. 310/214 |
| 6,615,470 B2 | * | 9/2003 | Corderman et al. ..... 29/402.13 |

FOREIGN PATENT DOCUMENTS

| | | |
|---|---|---|
| EP | 0298273 | 1/1989 |
| EP | 0656681 | 6/1995 |

OTHER PUBLICATIONS

Gardner W C, "Generator Rotor Long Ring Modifications Without Rewinds", Proceedings of the 57th American Power Conference, vol. 2, 1995, pp. 1000–1004, XP001155376, Chicago, USA.

* cited by examiner

*Primary Examiner*—A. Dexter Tugbang
*Assistant Examiner*—Tim Phan

(57) ABSTRACT

An improved generator rotor (30) and a method of repairing an existing generator rotor (12) are disclosed. Methods consistent with the present invention provide techniques for repairing existing stress-damaged rotors (12) to remove stress-induced cracks (29), without requiring new retaining rings (16), to significantly extend the useful life of a generator without the cost and complexity of conventional repair techniques. Improved generator rotors (30) consistent with the present invention provide a tooth-top design that is more resistant to stress-induced cracking than conventional designs, resulting in new generators with longer useful lives.

5 Claims, 6 Drawing Sheets

METHOD FOR REPAIRING GENERATOR ROTOR

FIELD OF THE INVENTION

The present invention relates generally to electrical generators, and more particularly to an improved generator rotor and a method of repairing existing generator rotors to eliminate stress-induced cracks.

BACKGROUND

After prolonged use, stress-induced cracks may develop in the tooth tops of an electrical generator's rotor at locations near the ends of the rotor referred to as rotor-end sections. A conventional approach to repairing such cracks is disclosed in U.S. Pat. No. 5,174,011 to Weigelt, which is incorporated by reference herein in its entirety. Weigelt discloses machining damaged teeth to remove large sections of stress-damaged material. The nature and extent of the machining disclosed in Weigelt makes it necessary to replace the generator's retaining rings. Replacing a generator's retaining rings adds significant cost and complexity to the repair of a generator.

A new approach to refurbishing generators is needed that facilitates the removal of stress-induced cracks in a generator's rotor teeth, without requiring the replacement of the generator's original retaining rings. A new design for newly-manufactured rotor-teeth is also needed for providing generators that are resistant to tooth-top stress-induced cracks and to extend the useful life of generators.

SUMMARY OF THE INVENTION

With the foregoing in mind, an improved generator rotor and a method of repairing existing generator rotors are provided. Improved generator rotors consistent with the present invention provide a tooth-top design that is more resistant to stress-induced cracking than conventional designs. Methods consistent with the present invention also provide techniques for repairing existing stress-damaged rotors to remove stress-induced cracks, without requiring new retaining rings.

These and other objects, features, and advantages in accordance with the present invention are provided by both methods and systems. A method is disclosed for repairing a generator rotor having a rotor tooth with a tooth root and a tooth top, said tooth top including an outboard and an inboard region for supporting a retaining ring, wherein said outboard and inboard regions each comprise a retaining-ring land, a wedge land, and a fillet. The method comprising the steps of (a) inspecting said fillet of said outboard region with a non-destructive testing means to determine the maximum depth cracks in said fillet; (b) when said maximum depth of said cracks in said outboard fillet are less than or equal to about 0.03", removing at least about 0.06" of material beyond said fillet and directly radial, whereby said wedge land of said outboard region is removed; (c) when said maximum depth of said cracks in said outboard fillet are greater than about 0.03" and less than about 0.07", removing about 0.03" of material beyond said maximum depth of said cracks and directly radial, whereby said wedge land of said outboard region is removed; (d) inspecting said fillet of said inboard region with a non-destructive testing means to determine the maximum depth cracks in said fillet; (e) when said maximum depth of said cracks in said inboard fillet are less than or equal to about 0.03", removing at least about 0.03" of material beyond said fillet; and (f) when said maximum depth of said cracks in said inboard fillet are greater than about 0.03" and less than about 0.06", removing about 0.03" of material beyond said maximum depth of said cracks.

A generator rotor is also disclosed that comprises a rotor tooth having a tooth root and a tooth top, said tooth top including an outboard and an inboard region for supporting a retaining ring, wherein said outboard and inboard regions each comprise a retaining-ring land, a wedge land, and a fillet, wherein said outboard retaining-ring land has smaller surface area than said inboard retaining-ring land, with substantially radial sidewalls that transitions to a fillet having a radius of about 0.5", and wherein said fillet of said inboard region has a compound radius with an upper radius of about 0.125" and a lower radius of about 0.063".

DETAILED DESCRIPTION

Figure 1:
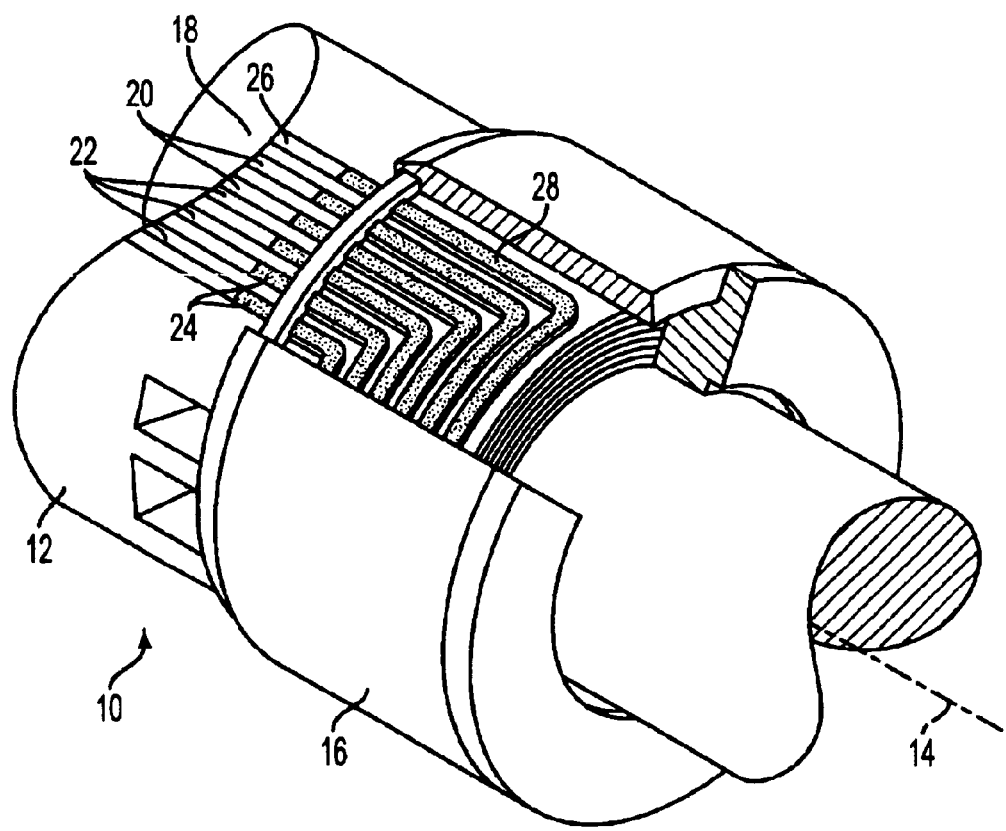
FIG. 1 illustrates a conventional rotor assembly.

Electrical generators utilized in the power-generation industry typically include a rotor with two retaining-ring assemblies like the one illustrated in FIG. 1. The rotor assembly 10 includes a rotor 12, aligned for rotation about a longitudinal axis 14 and a retaining ring 16, installed on each end of the rotor 12. The rotor 12 includes a tooth region 18 with multiple longitudinal slots 20 defining a plurality of longitudinal teeth 22. Field windings 24 are disposed between the longitudinal teeth 22 and within the slots 20. The field windings 24 run the length of the rotor and make turns at each end of the rotor 12 to form end turns 28.

When the rotor assembly 10 is spinning, a radially-outward centrifugal force is exerted on the windings 24 and the end turns 28. In order to retain the field windings 24 tightly within the slots 20, wedges 26 are positioned in the openings of the slots 20. However, the end turns 28 extend beyond the rotor slots 20 and are not retained by these wedges. In order to restrain the end turns 28, a retaining ring 16 is installed over each end of the rotor 12. The inside diameter of retaining ring 16 is formed with an inside diameter that is slightly smaller than the outside diameter of the rotor 12. During the manufacturing of the rotor assembly 10, the retaining ring 16 is heated to expand its inside diameter to facilitate its installation over the rotor 12. When the retaining ring 16 cools, a shrink fit is created between the retaining ring 16 and the rotor 12.

Figure 2:
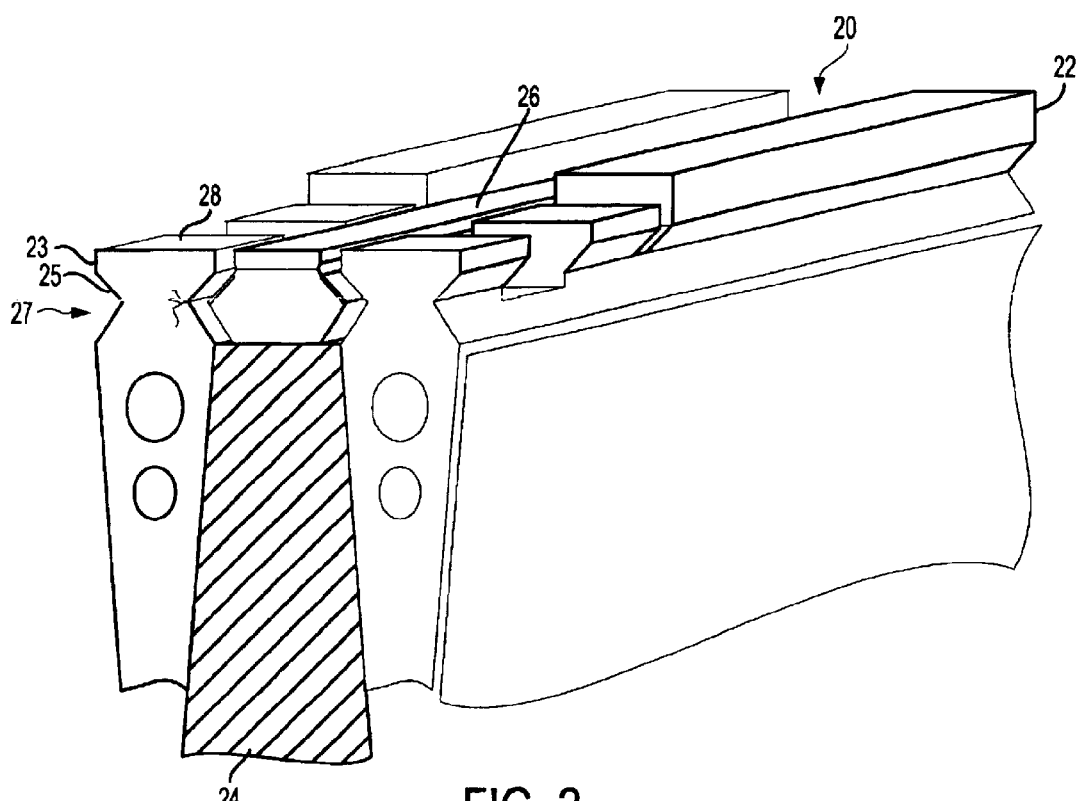
FIG. 2 illustrates a perspective view of the rotor assembly of FIG. 1, with the retaining ring removed.

FIG. 2 illustrates an enlarged perspective view of the tooth region 18 of FIG. 1. The retaining ring 16 has been omitted for clarification. As illustrated in FIG. 2, windings 24 are restrained by wedges 26 within a longitudinal slot 20 formed between adjacent teeth 22. When the rotor assembly is spinning, the windings 24 and wedge 26 exert a radially-outward force on the tooth tops 23 at the wedge lands 25. The shrink-fitted retaining ring exerts an opposing radially-inward force on the wedge 26 and the retaining-ring lands 28. When the rotor assembly is not spinning (for example, during idle periods), the radially-inward force exerted by the shrink-fitted retaining ring is not balanced by the centrifugal forces exerted on the wedge 26. As a result, the tooth tops 23 tend to be subjected to excessive stresses when a generator is cycled on and off. These stresses tend to form cracks 29 near the filets 27 of the tooth tops 23. The more frequently a generator is cycled, the more likely such cracks are to form.

Figure 3:
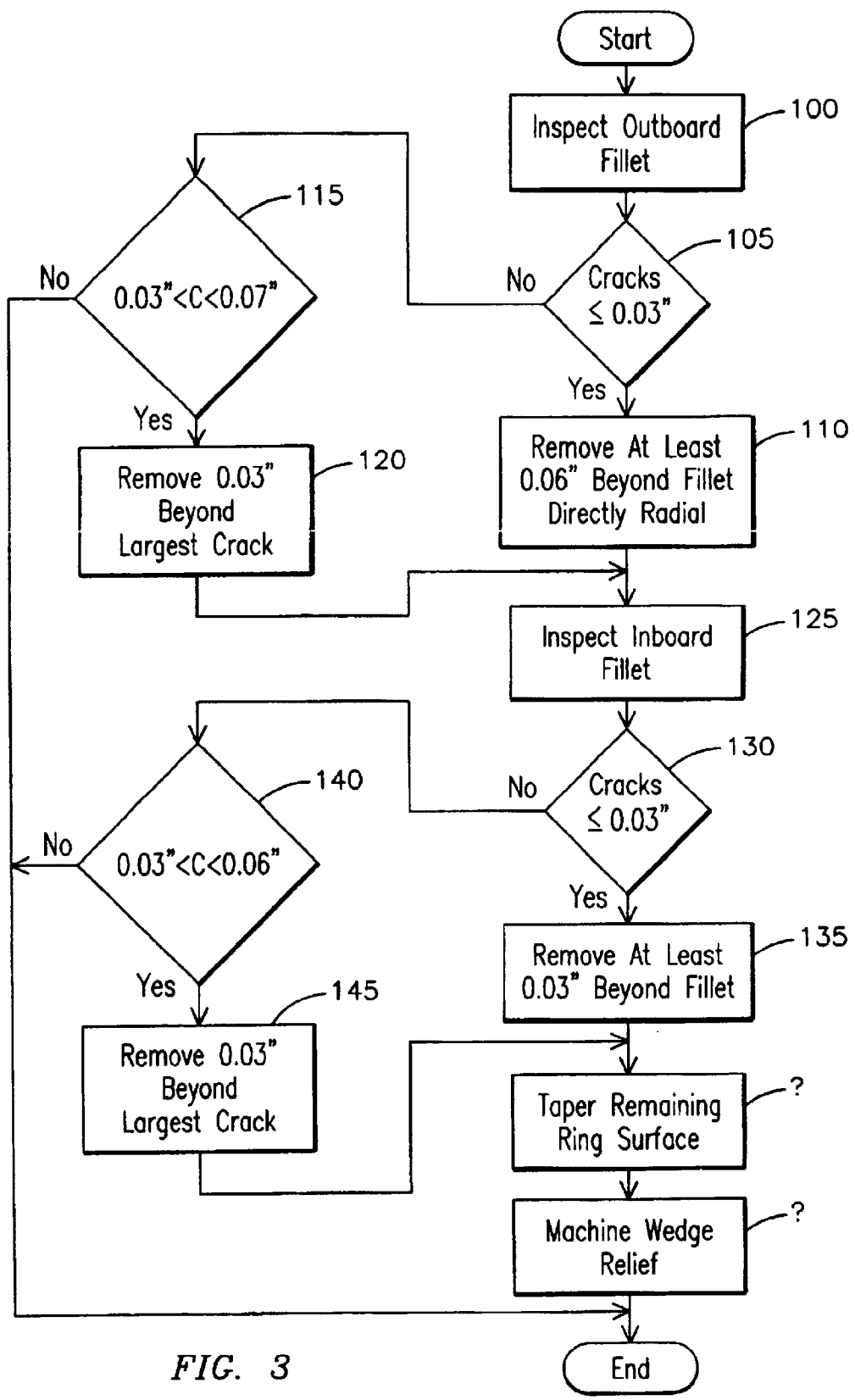
FIG. 3 is a flowchart illustrating a method consistent with the present invention.
Figure 4:
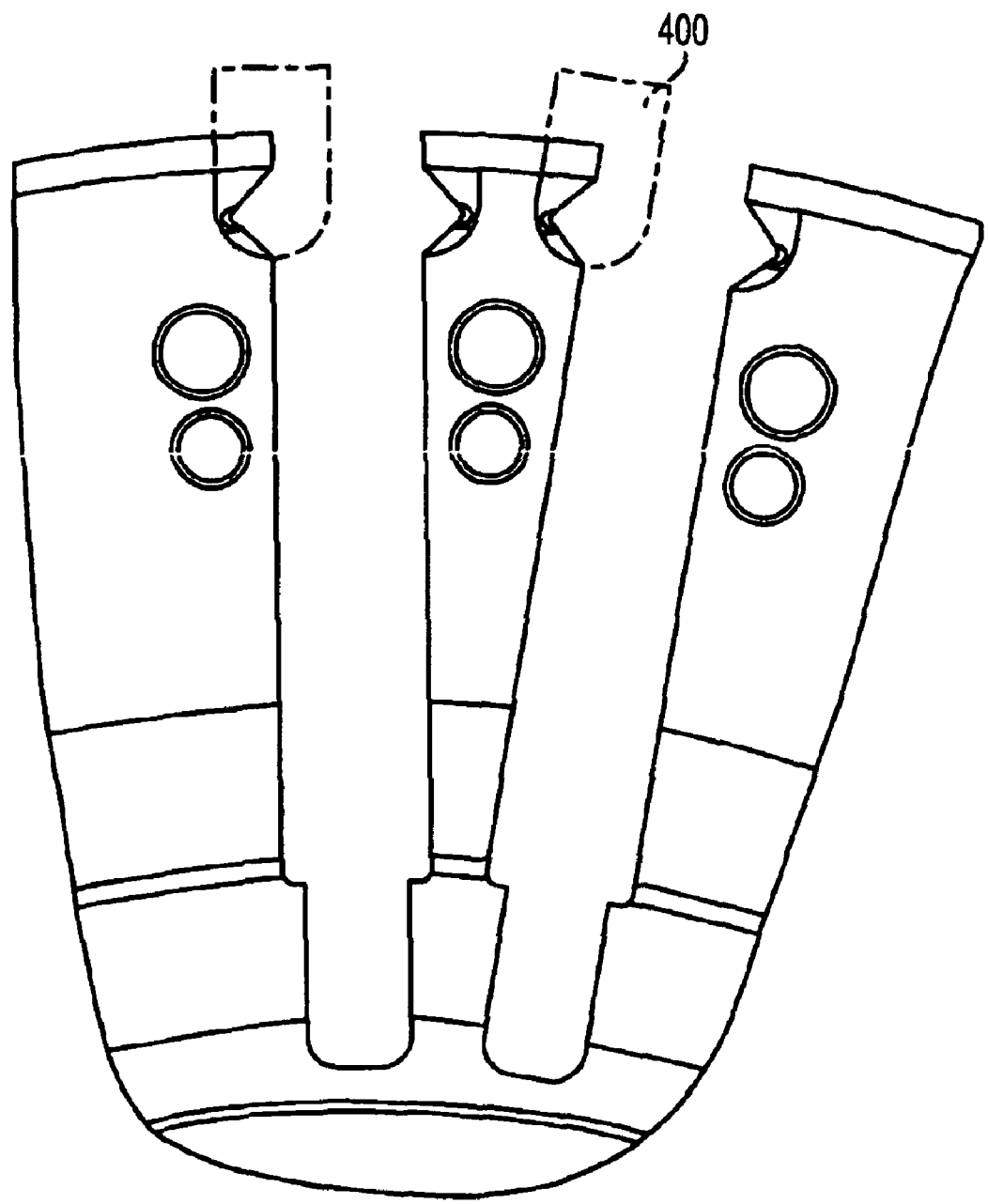
FIG. 4 illustrates the formation of an outboard region of a rotor-tooth top consistent with the present invention.

FIG. 3 illustrates a method of repairing a generator rotor consistent with the present invention. When an electrical generator is disassembled for repair, the outboard sections of the rotor are inspected using a non-destructive test, such as an ultrasonic or eddy-current test, to determine the depth of the stress cracks in the area near the fillets of the tooth top (step 100). If the cracks detected have a maximum depth of less than or equal to about 0.03" (decision 105), then at least about 0.06" of the outboard-retaining-ring land 28 is removed beyond the fillet and directly radial by a horizontal mill or other suitable machining device 400, as illustrated in FIG. 4 (step 110). If the cracks detected have a maximum depth of greater than about 0.03" and less than about 0.07" (decision 115), then about 0.03" of the outboard-retaining-ring land 28 is removed beyond the largest crack depth and directly radial, as illustrated in FIG. 4 (step 120). If the cracks detected have a maximum depth of greater than about 0.07", the method of the present invention may not be suitable for repairing the rotor.

Figure 5:
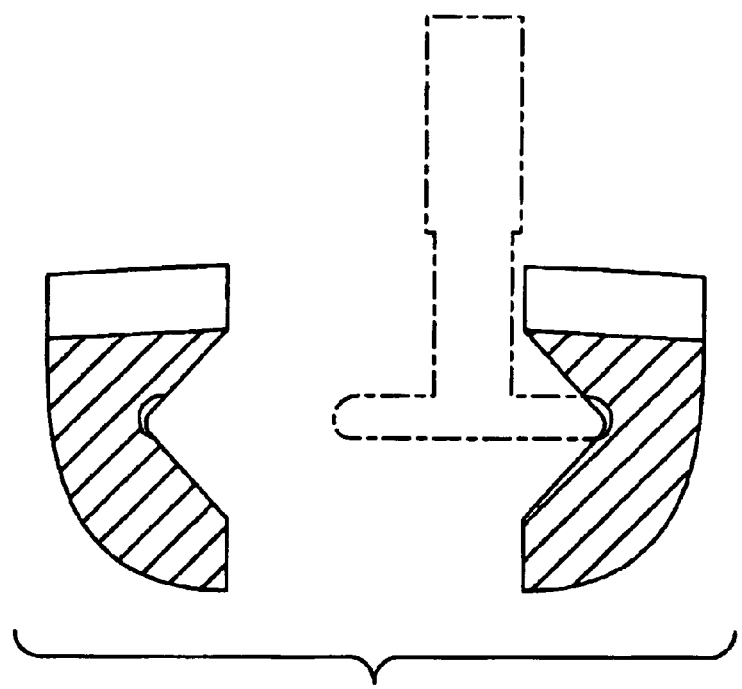
FIG. 5 illustrates the formation of an inboard region of a rotor-tooth top consistent with the present invention.

The inboard-retaining-ring land is also inspected using a non-destructive test to determine the depth of the stress cracks in the inboard fillets (step 125). If the cracks detected have a maximum depth of less than or equal to about 0.03" (decision 130), then at least about 0.03" of rotor material is removed beyond the fillet by a horizontal mill or other suitable machining device 500, as illustrated in FIG. 5 (step 135). The fillet may be machined, for example, in an inboard direction for the length of the retaining ring land or beyond the retaining ring land for a short distance. If the cracks detected have a maximum depth of greater than about 0.03" and less than about 0.06" (decision 140), then about 0.03" of rotor material is removed beyond the largest crack depth (step 145). If the cracks detected have a maximum depth of greater than about 0.06", the method of the present invention may not be suitable for repairing the rotor.

In one embodiment of the present invention, the retaining ring lands of the outboard and inboard regions are also machined to form a tapered shrink fit with a height (or radius) that decreases in an inboard direction. The tapered shrink fit interference values vary depending on the rotor diameter, the retaining ring thickness, and the length of the shrink fit. The tap shrink fit ensures a more uniform stress distribution and minimizes the alternating cyclic fatigue stresses.

Figure 6:
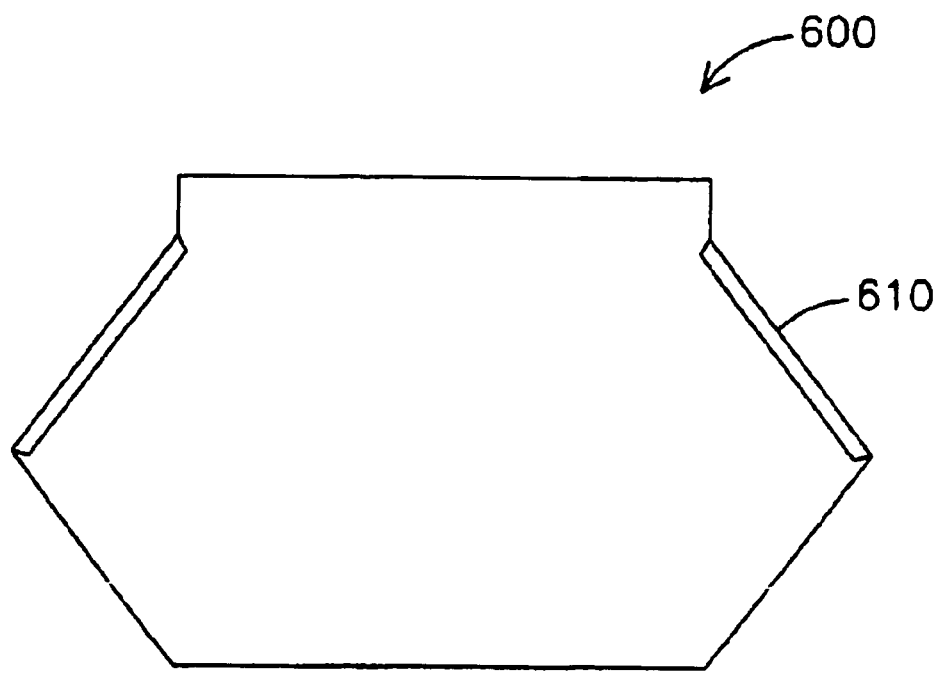
FIG. 6 illustrates a wedge consistent with the present invention.

In another embodiment of the present invention, a wedge 600 (illustrated in FIG. 6) for use with the rotor may be machined to form wedge reliefs 610. The wedge reliefs provide the allow the end wedges to have additional radial movement so that the centrifugal load can be transferred fully or partially to the retaining ring at speed. In this way, the rotor tooth top is subjected no load or partial load from the winding in the slot at speed. Typical wedge relief values used are around 0.010" to 0.030". For rotors with 930 mm outer diameter, a wedge relief of 0.020" has been applied over the length of 3.57" from the end. For a rotor with 1075 mm outer diameter, a wedge relief of 0.020" has been applied over the length of 3.75" from the end.

Figure 7:
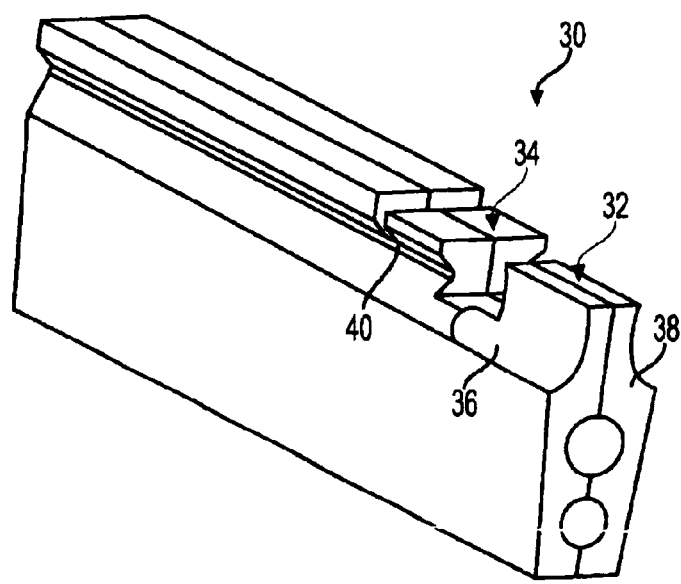
FIG. 7 illustrates a new or repaired rotor consistent with the present invention.

The features of the improved rotor-tooth top described above may also be incorporated into newly-manufactured rotors to form an improved rotor with an increased resistance to stress-induced cracking. FIG. 7 illustrates a new rotor with an improved rotor-tooth top 30 consistent with the present invention. The improved rotor-tooth top 30 includes an outboard-end section 32 and an inboard-end section 34. The outboard-end section 32 has an enlarged fillet 36 and a substantially radial side-wall 38. The inboard-end section 34 also has an enlarged fillet 40. The dimensions of the enlarged fillet 36 and side-wall 38 in new rotors will vary depending on the dimensions of the rotors. The dimensions of the enlarged fillet 36 and the side-wall 38 in repaired rotors will vary depending upon the dimensions of the rotors and the depth of the stress cracks found during inspection.

The present invention has been described with reference to the accompanying drawings that illustrate preferred embodiments of the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. Thus, the scope of the invention should be determined based upon the appended claims and their legal equivalents, rather than the specific embodiments described above.

What is claimed is:

1. A method of repairing a generator rotor having a rotor tooth with a tooth root and a tooth top, said tooth top including an outboard and an inboard region for supporting a retaining ring, wherein said outboard and inboard regions each comprise a retaining-ring land, a wedge land, and a fillet, said method comprising the steps of:

inspecting said fillet of said outboard region with a non-destructive testing means to determine the maximum depth cracks in said fillet;

when said maximum depth of said cracks in said outboard fillet are less than or equal to about 0.03", removing at least about 0.06" of material beyond said fillet and directly radial, wherein said wedge land of said outboard region is removed;

when said maximum depth of said cracks in said outboard fillet are greater than about 0.03" and less than about 0.07", removing about 0.03" of material beyond said maximum depth of said cracks and directly radial, wherein said wedge land of said outboard region is removed;

inspecting said fillet of said inboard region with the non-destructive testing means to determine the maximum depth cracks in said fillet;

when said maximum depth of said cracks in said inboard fillet are less than or equal to about 0.03", removing at least about 0.03" of material beyond said fillet; and when said maximum depth of said cracks in said inboard fillet are greater than about 0.03" and less than about 0.06", removing about 0.03" of material beyond said maximum depth of said cracks.

2. The method of claim 1, further comprising the step of machining said retaining-ring land of said outboard and inboard retaining-ring seats to form a taper having a radius decreasing in the inboard direction.

3. The method of claim 2 wherein said step of machining said retaining-ring land comprises machining said outboard retaining ring seat to form a first taper having a first slope and machining said inboard retaining ring seat to form a second taper having a second slope.

4. The method of claim 2, further comprising the step of machining a wedge for adaptable for use with said generator rotor by removing approximately 0.02" of material from surfaces on said wedge that contact said wedge lands of said tooth top.

5. The method of claim 4 wherein said step of machining a wedge includes machining said wedge from an outboard end to about 0.5" past a shrink fit area of said wedge.

* * * * *